United States Patent Office 3,541,067
Patented Nov. 17, 1970

3,541,067
9β-METHYL-3,11β,17α-TRIOXYGENATED-19-NORPREGNA-1,3,5(10)-TRIEN-20-ONES
Clarence G. Bergstrom, Chicago, Ill., assignor to G. D. Searle & Co., Chicago, Ill., a corporation of Delaware
No Drawing. Filed Sept. 26, 1968, Ser. No. 762,983
Int. Cl. C07c 169/32
U.S. Cl. 260—397.45        11 Claims

ABSTRACT OF THE DISCLOSURE

9β-methyl-3,11β,17α-trioxygenated - 19 - norpregna-1,3,5(10)-trien-20-ones preparable by utilizing as starting materials the corresponding 17-oxygenated 9β,11β-epoxypregn-4-ene-3,20-diones are useful as valuable pharmacological agents, as is exemplified by their anti-inflammatory, anti-ulcerogenic and anti-bacterial properties.

---

The present invention is concerned with novel chemical compounds characterized by a 9β-methyl group and a 19-norpregnatriene ring structure and, more particularly with 9β-methyl-3,11β,17α-trioxygenated - 19 - norpregna-1,3,5(10)-trien-20-ones represented by the following structural formula

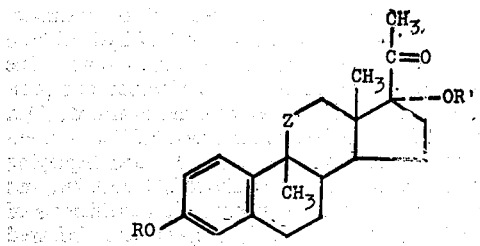

wherein R is hydrogen or a lower alkyl or lower alkanoyl radical, R' is hydrogen or a lower alkanoyl radical and Z is a carbonyl, β-hydroxymethylene or β-(lower alkanoyl)-oxymethylene radical.

Illustrative of the lower alkyl radicals encompassed by the foregoing structural representation are methyl, ethyl, propyl, butyl, pentyl, hexyl, heptyl and the branched-chain groups isomeric therewith.

The lower alkanoyl radicals denoted therein are typified by formyl, acetyl, propionyl, butyryl, valeryl, caproyl, heptanoyl and the corresponding branched-chain isomers.

The compounds of this invention are conveniently produced by utilizing as starting materials 9β,11β-epoxy steroids as defined by the following structural formula

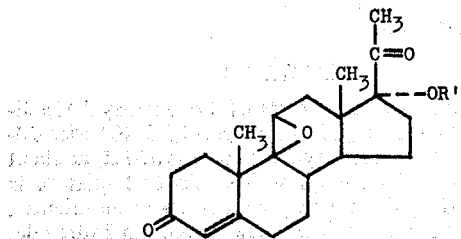

wherein R' is hydrogen or a lower alkanoyl radical as hereinbefore defined. Rearrangement of those starting materials is effected by reaction with a suitable electron acceptor, i.e., inorganic proton acids such as perchloric acid, sulfuric acid, hydrofluoric acid, hydrochloric acid, and hydrobromic acid and Lewis acids such as boron trifluoride, aluminum chloride, etc. That process is exemplified by the reaction of 17α-acetoxy-9β,11β-epoxypregn-4-ene-3,20-dione with a mixture of 50% aqueous per-chloric acid and chloroform to afford 17α-acetoxy-3,11β-dihydroxy - 9β - methyl-19-norpregna-1,3,5(10)-trien-20-one.

Acylation of the instant 3,11β-dihydroxy compounds under carefully controlled conditions results in selective reaction of the phenolic hydroxy group. A specific example is the low temperature reaction of 17α-acetoxy-3,11β - dihydroxy-9β-methyl-19-norpregna-1,3,5(10)-20-one with acetic anhydride in pyridine for about 1 hour, thus affording 3,17α-diacetoxy-11β-hydroxy-9β-methyl-19-norpregna-1,3,5(10)-trien-20-one. When that reaction is conducted at room temperature for an extended time, acylation at both the 3 and 11 positions occurs. The latter starting material when contacted with acetic anhydride and pyridine under those more strenuous conditions affords 3,11β,17α-triacetoxy-9β-methyl - 19 - norpregna-1,3,5(10)-trien-20-one.

Manufacture of the instant 3-(lower alkoxy) derivatives is conveniently effected by reaction of the corresponding 3-hydroxy compound with a suitable alkylating agent, for example an alkyl halide or dialkyl sulfate. 17α-acetoxy-3,11β - dihydroxy-9β-methyl-19-norpregna-1,3,5-(10)-trien-20-one in dimethylformamide is thus contacted with dimethyl sulfate and aqueous sodium hydroxide at 0–5° for 2 hours to yield 17α-acetoxy-11β-hydroxy-3-methoxy-9β-methyl-19-norpregna - 1,3,5(10) - trien-20-one.

Reaction of the instant 11β-hydroxy compounds with a suitable oxidizing agent results in the corresponding 11-keto compounds. When 3,17α-diacetoxy-11β-hydroxy-9β-methyl-19-norpregna-1,3,5(10)-trien-20-one is allowed to react with chromium trioxide in pyridine, there is thus produced 3,17α - diacetoxy-9β-methyl-19-norpregna-1,3,5-(10)-triene-11,20-dione.

The compounds of this invention exhibit valuable pharmacological properties. They are, for example, anti-ulcerogenic and anti-inflammatory agents. The 17-hydroxy compounds, in addition, display anti-bacterial activity in view of their ability to inhibit the growth of microorganisms such as *Diplococcus pneumoniae*.

The anti-inflammatory property of the instant compounds is specifically illustrated by the activity of 17α-acetoxy-3,11β-dihydroxy-9β-methyl-19-norpregna - 1,3,5-(10)-trien-20-one and 3,11β,17α - trihydroxy-9β-methyl-19-norpregna-1,3,5(10)-trien-20-one when tested in the following assay, which is a modification of that disclosed by Dulin, Proc. Soc. Exp. Biol. Med., 90, 115 (1955):

Male rats weighing 180–220 g. are adrenalectomized and arranged into groups of 6 animals each. The animals are maintained on 0.86% saline drinking water for the duration of the test and are supplemented with 5% aqueous glucose for the first 24 hours following adrenalectomy. On the day following the operation, 4 cotton dental pellets, with an average weight of approximately 6 mg., are individually implanted in a bilateral position in the pectoral and dorsal lateral neck regions of each rat. The test compound, dissolved or suspended in a saline-wetting agent mixture or in corn oil, is administered by stomach tube on the day of the pellet implantation and the treatment is repeated on the following day. An initial dose of 20 mg. on each of the 2 days is normally employed. On the day following the last treatment the rats are sacrified and the pellets with associated granuloma tissue are carefully dissected, dried and weighed. These weights are compared with those from a group of control animals concurrently treated as above save for omission of the test compound. The test compound is rated active if it causes a significant decrease (P<0.05) in the weight of the encapsulated tissues surrounding the cotton pellets.

The anti-ulcerogenic property of the instant compounds is specifically illustrated by the ability of 11β,17α-dihydroxy-3-methoxy-9β-methyl-19-norpregna-1,3,(10)-trien- 20-one, 3,11β,17α-triacetoxy-9β-methyl-19-norpregna-1,3,5(10)-trien-20-one, 3,11β,17α-triacetoxy-9β-methyl - 19-norpregna-1,3,5(10)-trien-20-one, 17α-acetoxy-3-methoxy-9β-methyl-19-norpregna-1,3,5(10)-trien-11,20 - dione and 11β,17α-diacetoxy-3-hydroxy-9β-methyl-19-norpregna-1,3,5(10)-trien-20-one to inhibit the ulceration reported by Shay et al., Gastroenterology, 5, 43 (1945) to occur in rats subjected to fasting and pyloric ligation. In this test, male Charles River rats weighing 200–250 g. and fasted 72 hours prior to ligation are used. Immediately following ligation, the prescribed dose of compound, dissolved or suspended in 1.0 ml. of pH 2.0 hydrochloric acid is intragastrically administered to each of a gorup of 6 animals. An initial dose of 50 mg. per kg. of body weight is normally employed. A like group of animals to which is identically and concurrently administered the acid alone serves as control. Precisely 19 hours later the stomachs of surviving animals are excised and examined under 5× magnification. The number of ulcers occurring in the non-secretory protion of each stomach is counted in 4 groups according to size, i.e. less than 2 mm., 2–4 mm. and greater than 8 mm. Each rate is then assigned a score, z, which is a weighted average of the logarithms of the ulcer counts in several size groups determined by a formula found approximately optimal by discriminant function analysis to be as follows:

$$z = 20.00 \log(N_1+1) + 0.22 \log(N_2+1) + 46.76 \log(N_3+1) + 6.11 \log(N_4+1)$$

wherein $N_1 \ldots N_4$ are the observed ulcer counts of the increasing size groups. Since long term studies in approximately 400 animals show that the average z value for controls is 96.2, with a standard error per group of 6 equal to 18.97, a decrease in the average z score for a given test group, relative to concurrent controls, amounting to 37.5 or more is significant ($P \leq 0.05$); and a compound producing such a decrease is considered anti-ulcerogenic.

The anti-bacterial property of the 17-hydroxy compounds of this invention is specifically illustrated by the activity of 3,11β,17α-trihydroxy-9β-methyl-19-norpregna-1,3,5(10)-trien-20-one when tested in the following assay:

Sterile blood agar is inoculated with a 24-hour broth culture of the bacterium, *Diplococcus pneumoniae*, whereupon approximately 5 mg. of the test compound is placed on the inoculated agar surface. The agar is then incubated at 37° C. for 24 hours, at the end of which time it is observed for zones of inhibition in the area immediately surrounding the test compound. Compounds which are effective in causing a zone of inhibition are designated active.

The invention will appear more fully from the examples which follow. These examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted.

EXAMPLE 1

A solution of 10 parts of 17α-acetoxy-9β,11β-epoxypregn-4-ene-3,20-dione in 300 parts of purified chloroform is added, over a period of about 2 minutes with stirring, to 200 parts by volume of 50% aqueous perchloric acid in a nitrogen atmosphere. Stirring is continued for about 1 hour longer, at the end of which time the reaction mixture is cooled and diluted with water. The resulting reddish precipitate is collected by filtration, then washed on the filter successively with water and chloroform. That material is dissolved in tetrahyrofuran and the resulting solution is diluted with water to effect precipitation of the crude product. Purification of that material is effected by recrystallization from tetrahydrofuran-chloroform, thus affording 17α-acetoxy-3,11β-dihydroxy-9β-methylpregna-1,3,5(10)-trien-20-one, melting at about 259–268.5°. This compound exhibits an ultraviolet absorption maximum at about 281 millimicrons with a molecular extinction coefficient of 1930 and is represented by the following structural formula

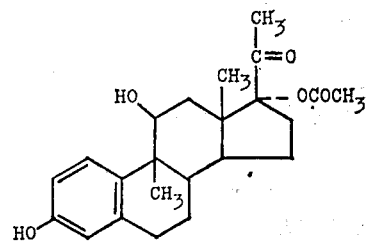

EXAMPLE 2

The substitution of an equivalent quantity of 9β,11β-epoxy-17α-propionoxypregn-4-ene-3,20-dione in the procedure of Example 1 results in 3,11β-dihydroxy-9β-methyl-17α-propionoxy-19-norpregna-1,3,5(10)-trien-20-one.

EXAMPLE 3

A mixture containing 25 parts of 17α-acetoxy-3,11β-dihydroxy-9β-methylpregna-1,3,5(10)-trien - 20 - one, 400 parts of methanol and 130 parts by volume of 1 N aqueous sodium hydroxide is heated at the reflux temperature for about 2 hours, at the end of which time 112 parts of ethyl acetate is added. Heating at the reflux temperature is continued for about 15 minutes longer and the mixture is then partially concentrated to remove the organic solvent. The residual aqueous mixture is diluted with approximately 250 parts of water and 100 parts of 1 N hydrochloric acid, then is vigorously stirred for about 24 hours. The tan granular precipitate is removed by filtration and purified by recrystallization from acetone-ether to afford 3,11β,17α-trihydroxy-9β-methyl-19-norpregna-1,3,5(10) - trien-20-one etherate, melting at about 97.5–131° and displaying ultraviolet absorption maxima at about 224, 230, 281 and 287 millimicrons with molecular extinction coefficients of 9,150, 6,000 2,370 and 2,150, respectively. Infrared absorption peaks are observed, in chloroform, at about 2.77, 2.85–2.95, 5.86 and 5.90 microns. Nuclear magnetic resonance maxima appear at about 56, 64, 71, 76, 78, 131, 204, 211, 218, 225, 276, 396, 398, 402, 405, 426 and 435 cycles per second. This compound is represented by the following structural formula

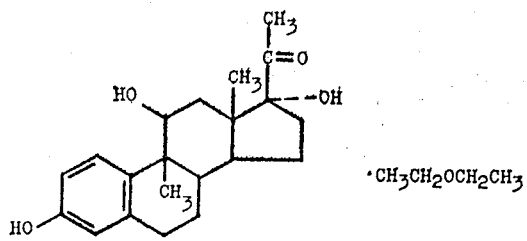

EXAMPLE 4

To a solution of 35.88 parts of 17α-acetoxy-3,11β-dihydroxy - 9β - methyl-19-norpregna-1,3,5(10)-trien-20-one in 684 parts of dimethylformamide is added, at about 0°, 48.6 parts of dimethyl sulfate. To that mixture is then added, dropwise over a period of about 30 minutes, 72 parts by volume of 10% aqueous sodium hydroxide, during which time the temperature is maintained below 5°. After approximately 2 hours the reaction mixture is diluted with water, keeping the temperature below 6°, and the resulting precipitated product is collected by filtration. Purification of that product by recrystallization from ethanol affords 17α-acetoxy-11β-hydroxy-3-methoxy-9β - methyl - 19 - norpregna - 1,3,5(10)-trien-20-one, melting at about 199.5–202°. This compound exhibits ultraviolet absorption maxima at about 222, 278 and 287 millimicrons with molecular extinction coefficients of about 9160, 1880 and 1720, respectively. Infrared absorption peaks are observed, in chloroform, at about 2.74, 5.76 and 7.94 microns. The nuclear magnetic resonance spectrum contains peaks at about 56, 77, 106, 119, 228, 276, 400, 407, 428 and 439 cycles per second. This compound is further characterized by an optical rotation, in chloroform, of −33° and by the following structural formula

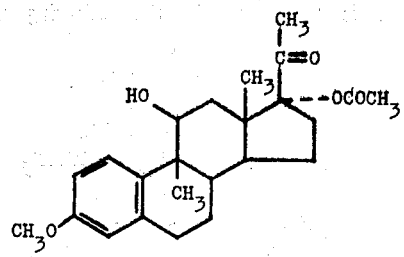

EXAMPLE 5

When equivalent quantities of 3,11β-dihydroxy-9β-methyl - 17α - propionoxy - 19 - norpregna-1,3,5(10)-trien-20-one and diethyl sulfate are substituted in the procedure of Example 4, there is produced 3-ethoxy-11β-hydroxy - 9β - methyl - 17α - propionoxy-19-norpregna-1,3,5(10)-trien-20-one.

EXAMPLE 6

To a solution of 38.92 parts of 17α-acetoxy-11β-hydroxy - 3 - methoxy - 9β - methyl-19-norpregna-1,3,5(10)-trien-20-one in 390 parts of methanol is added successively 389 parts of water and 97.4 parts by volume of 1 N aqueous sodium hydroxide. The resulting reaction mixture is stirred at the reflux temperature for about 3 hours, at the end of which time 9.9 parts of acetic acid is added. A portion of the solvent is removed by distillation, and the residual mixture is cooled, resulting in the separation of a gummy product. At that point, 92 parts of saturated aqueous sodium bicarbonate is added and the resulting mixture is allowed to stand at room temperature for about 1 hour. At the end of that time, the resulting partially crystalline solid product is collected by filtration and is purified by recrystallization from aqueous methanol, thus affording 11β - 17α - dihydroxy-3-methoxy-9β-methyl-19-norpregna-1,3,5(10)-trien-20-one methanalate, melting at about 65–71°. This compound exhibits ultraviolet absorption maxima at about 279 and 287 millimicrons with molecular extinction coefficients of about 1800 and 1700, respectively, infrared absorption peaks, in chloroform, at about 2.73, 2.82, 5.83, 5.90, 6.22 and 6.34 microns, and nuclear magnetic resonance maxima at about 59, 76, 131, 207, 226, 277, 280, 283, 398, 404, 407, 426, 428, 435 and 437 cycles per second. It is represented by the following structural formula

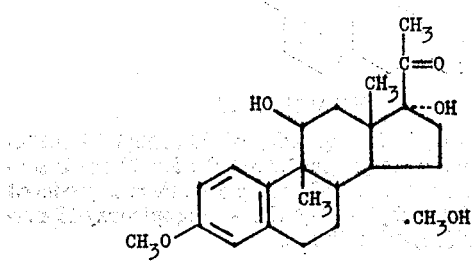

EXAMPLE 7

By substituting an equivalent quantity of 3-ethoxy-11β-hydroxy-9β-methyl-17α - propionoxy - 19 - norpregna-1,3,5(10)-trien-20-one and otherwise proceeding according to the procedure of Example 6, there is produced 3-ethoxy-11β,17α-dihydroxy-9β-methyl - 19 - norpregna-1,3,5(10)-trien-20-one.

EXAMPLE 8

To a solution of 10 parts of 17α-acetoxy-3,11β-dihydroxy - 9β - methyl - 19 - norpregna-1,3,5(10)-trien-20-one in 40 parts of pyridine is added, at about 2°, a cooled 20 part portion of acetic anhydride. The mixture is kept at 0–5° for about 1 hour, then is poured gradually into a stirred mixture of ice and water. The granular cream-colored solid which separates is collected by filtration and recrystallized, first from acetone-hexane, then from acetone containing decolorizing carbon to afford 3,17α-diacetoxy - 11β - hydroxy - 9β - methyl-19-norpregna-1,3,5(10)-trien-20-one, melting at about 209.5–213.5°. This compound exhibits ultraviolet absorption maxima at about 268 and 276 millimicrons with molecular extinction coefficients of 773 and 790, respectively, and also strong absorption in the region of 220 millimicrons. Infrared absorption peaks are observed at about 2.74, 5.69 and 5.78 microns. The nuclear magnetic resonance spectrum displays maxima at about 57, 79, 106, 120, 137, 160–180, 280, 283, 286, 411, 413, 415, 418, 420, 436 and 445 cycles per second. This compound is represented by the following structural formula

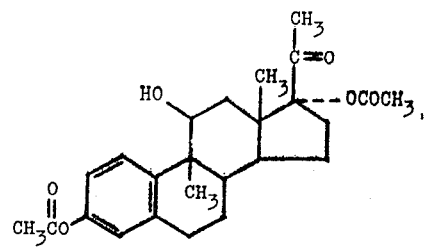

EXAMPLE 9

When equivalent quantities of 3,11β-dihydroxy-9β-methyl - 17α - propionoxy - 19 - norpregna-1,3,5(10)-trien-20-one and propionic anhydride are substituted in the procedure of Example 8, there is obtained 11β-hydroxy - 9β - methyl-3,17α - dipropionoxy - 19 - norpregna-1,3,5(10)-trien-20-one.

EXAMPLE 10

A mixture containing 10 parts of 17α-acetoxy-3,11β-dihydroxy - 9β - methyl - 19 - norpregna-1,3,5(10)-trien-20-one, 20 parts of acetic anhydride and 40 parts of pyridine is allowed to stand at room temperature for about 5 days, then is poured gradually into approximately 600 parts of a mixture of ice and water. The cream-colored solid precipitate is collected by filtration and is purified by recrystallization from acetone-hexane, thus affording 3,11β - 17α - triacetoxy - 9β - methyl - 19-norpregna-1,3,5(10)-trien-20-one, melting at about 149–151°. This compound exhibits ultraviolet absorption peaks at about 267 and 275 millimicrons with molecular extinction coefficients of about 565 and 565, respectively, and also strong absorption in the region of 220 millimicrons. Nuclear magnetic resonance peaks are displayed at about 49, 72, 107, 116, 126, 136, 350, 352, 355, 410, 412, 416, 418, 439 and 448 cycles per second. This compound is represented by the following structural formula

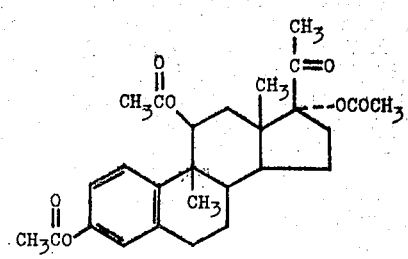

EXAMPLE 11

By substituting equivalent quantities of 3,11β-dihydroxy - 9β - methyl - 17α - propionoxy-19-norpregna-1,3,5(10)-trien-20-one and propionic anhydride in the procedure of Example 10, there is obtained 9β-methyl-3,11β,17α - tripropionoxy-19-norpregna-1,3,5(10)-trien-20-one.

EXAMPLE 12

175 parts of pyridine is cooled to approximately 15° and 17.5 parts of chromium trioxide is added in small amounts over a period of about 30 minutes, during which time and mixture is stirred and the temperature is maintained at 15–19°. A solution of 17.48 parts of 17α-acetoxy-11β-hydroxy-3-methoxy - 9β - methyl - 19-norpregna-1,3,5(10)-trien-20-one in 150 parts of pyridine is then added. After stirring for about 18 hours, the reaction mixture is partitioned between water and benzene-ether and the organic layer is separated and washed with water. The combined aqueous layers are extracted with ether and the ether extract is added to the original organic layer. That organic solution is dried over anhydrous sodium sulfate, then is concentrated under reduced pressure to afford a syrupy residue. This material is azeotropically distilled with toluene and the resulting residue is recrystallized from acetone-hexane to afford 17α-acetoxy-3-methoxy-9β-methyl-19 - norpregna - 1,3,5(10)-triene-11,20-dione, melting at about 148-150.5°. Ultraviolet absorption maxima are observed at about 279.5 and 286 millimicrons with molecular extinction coefficients of about 1790 and 1630, respectively. Strong absorption in the region of 220 millimcrons is observed. Infrared absorption peaks are observed, in chloroform, at about 5.76 and 5.87 microns. The nuclear magnetic resonance spectrum displays peaks at about 38, 83, 117, 119, 228, 404 and 407 cycles per second. This compound is represented by the following structural formula

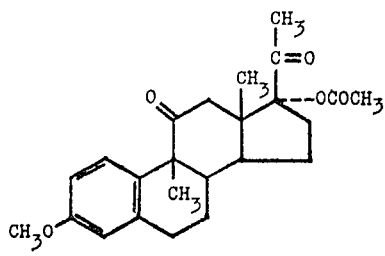

EXAMPLE 13

By substituting an equivalent quantity of 3-ethoxy-11β-hydroxy-9β-methyl - 17α - propionoxy-19-norpregna-1,3,5(10)-trien-20-one and otherwise proceeding according to the processes of Example 12, there is obtained 3-ethoxy-9β-methyl-17α-propionoxy - 19 - norpregna-1,3,5 (10)-triene-11,20-dione.

EXAMPLE 14

260 parts of pyridine is cooled to approximately 2° and 17.33 parts of chromium trioxide is added portionwise with stirring and cooling, during which time the temperature of the mixture is kept below 7°. An additional 90 parts of pyridine is then added, following which time 8.67 parts of chromium trioxide is added in small portions. To that mixture is added a solution of 26 parts of 3,17α-diacetoxy-11β-hydroxy-9β-methyl-19-norpregna-1,3,5(10)-trien-20-one in 70 parts of pyridine over a period of about 10 minutes. The mixture is then diluted with approximately 100 parts of pyridine, following which time stirring is continued for about 22 hours. At the end of that reaction period, the mixture is partitioned between water and benzene-ether and the organic layer is separated, then washed with water, dried over anhydrous sodium sulfate and stripped of solvent under reduced pressure. The residual material is azeotropically distilled with toluene in order to remove traces of pyridine, then is recrystallized from acetone-hexane, thus affording 3,17α-diacetoxy-9β-methyl-19-norpregna-1,3,5(10)-triene-11,20-dione, which melts at about 156.5–166°. This compound exhibits ultraviolet absorption peaks at about 268 and 275 millimicrons with molecular extinction coefficients of about 938 and 938, respectively, and also strong absorption in the region of 220 millimicrons. It is represented by the following structural formula

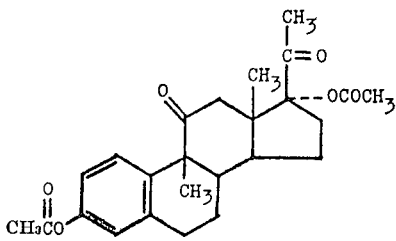

EXAMPLE 15

When an equivalent quantity of 11β-hydroxy-9β-methyl-3,17α-dipropionoxy - 19 - norpregna-1,3,5(10)-trien-20-one is substituted in the procedure of Example 14, there is produced 9β-methyl-3,17α-dipropionoxy-19-norpregna-1,3,5(10)-triene-11,20-dione.

EXAMPLE 16

A solution of 12 parts of 3,11β,17α-triacetoxy-9β-methyl-19-norpregna-1,3,5(10)-trien-20-one in 192 parts of methanol is cooled to approximately 5° and 120 parts by volume of a cooled 2% aqueous sodium hydroxide solution is added. After about 5 minutes the reaction mixture is neutralized by adding 25.2 parts of acetic acid, then is gradually diluted with water. The resulting crystalline precipitate is collected by filtration and purified by recrystallization from acetone-hexane to afford pale yellow rod-like crystals of 11β,17α-diacetoxy-3-hydroxy-9β-methyl-19 - norpregna - 1,3,5(10)-trien-20-one, which melts at about 226–231°. This compound exhibits ultraviolet absorption maxima at about 223.5, 281 and 287 millimicrons with molecular extinction coefficients of about 7940, 2140 and 1930, respectively, nuclear magnetic resonance peaks at about 51, 70, 107, 117.5, 126, 350, 353, 356, 397, 404, 407, 431 and 440 cycles per second. It is represented by the following structural formula

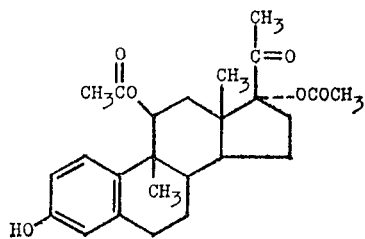

EXAMPLE 17

When an equivalent quantity of 9β-methyl-3,11β,17α-tripropionoxy-19-norpregna-1,3,5(10)-trien-20-one is substituted in the procedure of Example 16, there is produced 3-hydroxy-9β-methyl - 11β,17α - dipropionoxy-19-norpregna-1,3,5(10)-trien-20-one.

EXAMPLE 18

132 parts by volume of 2% aqueous sodium hydroxide is cooled to approximately 4° and is added to a solution of 13.16 parts of 3,17α-diacetoxy-9β-methyl-19-norpregna-1,3-5(10)-triene-11,20-dione in 211 parts of methanol, which solution had been cooled to approximately 2°. Approximately 5 minutes after completion of the addition, the mixture is neutralized with 27.3 parts of glacial acetic acid, then is gradually diluted with water. The resulting suspension is then cooled for approximately 2 hours and filtered, thus affording the crude product. Purification of that product by recrystallization from acetone-hexane affords pale yellow prism-like crystals of 17α-acetoxy-3-hydroxy-9β-methyl-19-norpregna - 1,3,5(10)-triene-11,20-dione, melting at about 256–261°. This compound exhibits an ultraviolet absorption peak at about 281.5 millimicrons with a molecular extinction coefficient of about 2030, strong absorption in the region of 220 millimicrons, infrared absorption maxima, in chloroform, at about 2.76, 2.92, 5.75, 5.81 and 5.86 microns and nuclear magnetic resonance peaks at about 39, 83, 117, 119.5, 329, 401.5 and 404.5 cycles per second. It is represented by the following structural formula

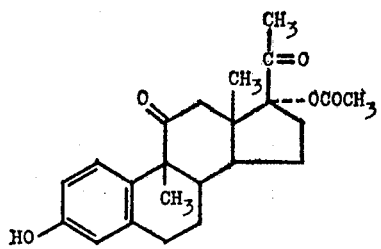

EXAMPLE 19

By substituting an equivalent quantity of 9β-methyl-3,17α-dipropionoxy-19-norpregna - 1,3,5(10)-triene-11,20-dione and otherwise proceeding according to the processes of Example 18, there is produced 3-hydroxy-9β-methyl-17α-propionoxy-19-norpregna - 1,3,5(10) - triene-11,20-dione.

EXAMPLE 20

A mixture containing 1 parts of 17α-acetoxy-3-hydroxy-9β-methyl-19-norpregna-1,3,5(10)-triene-11,20-dione, 5.2 parts by volume of 1 N aqueous sodium hydroxide and 16 parts of methanol is heated at the reflux temperature for about 2 hours, then is poured into approximately 200 parts of water. The resulting alkaline mixture is acidified to pH 2 by the addition of 1 N hydrochloric acid and the white solid product which separates is collected by filtration. Purification of that product is effected by recrystallization from acetone-hexane, thus affording faintly yellow prism-like crystals of 3,17α-dihydroxy-9β-methyl-19-norpregna-1,3,5(10)-triene-11,20-dione, melting at about 227–237.5°. Infrared absoprtion maxima are observed, in potassium bromide, at about 2.92, 2.98 and 5.88 microns and nuclear magnetic resonance maxima are observed at about 29.5, 74.5, 123, 200, 326, 393 and 549.5 cycles per second. This compound is represented by the following structural formula

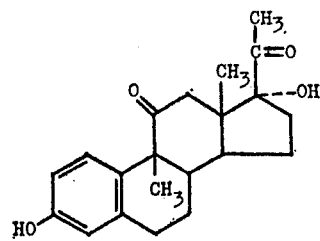

What is claimed is:
1. A compound of the formula

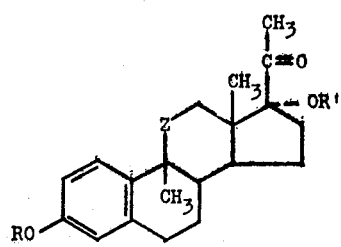

wherein R is selected from the group consisting of hydrogen, lower alkyl and lower alkanoyl radicals, R' is selected from the group consisting of hydrogen and lower alkanoyl radicals and Z is selected from the group consisting of carbonyl, β-hydroxymethylene and β-(lower alkanoyl)oxymethylene radicals.

2. As in claim 1, a compound of the formula

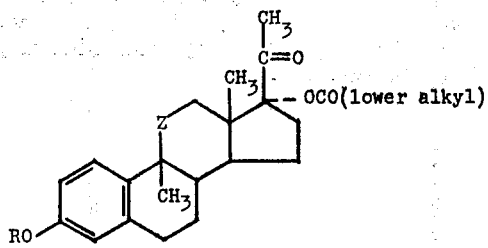

wherein R is selected from the group consisting of hydrogen, lower alkyl and lower alkanoyl radicals and Z is selected from the group consisting of carbonyl, β-hydroxymethylene and β-(lower alkanoyl)oxymethylene radicals.

3. As in claim 1, a compound of the formula

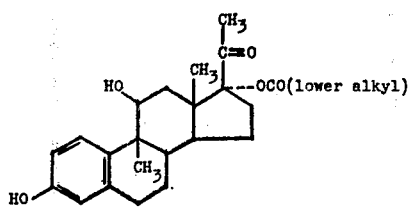

4. As in claim 1, a compound of the formula

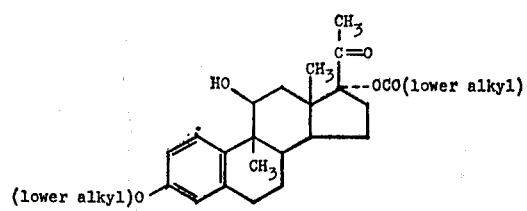

5. As in claim 1, a compound of the formula

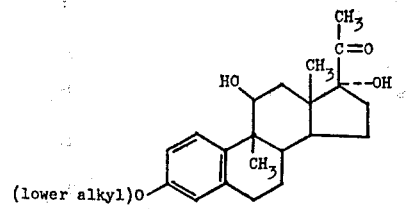

6. As in claim 1, a compound of the formula

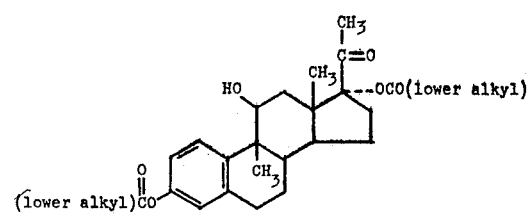

7. A compound according to claim 1, wherein R is hydrogen, R' is acetyl and Z is β-hydroxymethylene, that compound being 17α-acetoxy-3,11β-dihydroxy-9β-methyl-19-norpregna-1,3,5(10)-trien-20-one.

8. A compound according to claim 1, wherein R is methyl, R' is acetyl and Z is β-hydroxymethylene, that compound being 17α-acetoxy-11β-hydroxy-3-methoxy-9β-methyl-19-norpregna-1,3,5(10)-trien-20-one.

9. A compound according to claim 1, wherein R is methyl, R' is hydrogen and Z is β-hydroxymethylene, that compound being 11β,17α-dihydroxy-3-methoxy-9β-methyl-19-norpregna-1,3,5(10)-trien-20-one.

10. A compound according to claim 1, wherein R and R' are hydrogen and Z is β-hydroxymethylene, that compound being 3,11β,17α-trihydroxy-9β-methyl-19-norpregna-1,3,5(10)-trien-20-one.

11. A compound according to claim 1, wherein R and R' are acetyl and Z is β-hydroxymethylene, that compound being 3,17α-diacetoxy-11β-hydroxy-9β-methyl-19-norpregna-1,3,5(10)-trien-20-one.

References Cited
UNITED STATES PATENTS

| | | | |
|---|---|---|---|
| 3,258,471 | 6/1966 | Alvarez | 260—397.4 |
| 3,385,872 | 5/1968 | Alvarez | 260—397.4 |

ELBERT L. ROBERTS, Primary Examiner

U.S. Cl. X.R.
195—51; 424—243